(12) United States Patent
Hara

(10) Patent No.: US 12,056,410 B2
(45) Date of Patent: Aug. 6, 2024

(54) SYSTEM AND SYSTEM CONTROL METHOD

(71) Applicant: CANON KABUSHIKI KAISHA, Tokyo (JP)

(72) Inventor: Yosuke Hara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/499,007

(22) Filed: Oct. 31, 2023

(65) Prior Publication Data

US 2024/0143255 A1 May 2, 2024

(30) Foreign Application Priority Data

Nov. 2, 2022 (JP) .................. 2022-176788

(51) Int. Cl.
*G06F 3/12* (2006.01)

(52) U.S. Cl.
CPC .......... *G06F 3/1272* (2013.01); *G06F 3/1222* (2013.01); *G06F 3/1238* (2013.01)

(58) Field of Classification Search
CPC ... G06G 3/1272; G06G 3/1222; G06G 3/1238
See application file for complete search history.

(56) References Cited

U.S. PATENT DOCUMENTS

2010/0067051 A1* 3/2010 Seki ................. G06F 3/1267
358/1.15
2018/0336445 A1* 11/2018 Hayashi ............ G06K 15/4095

FOREIGN PATENT DOCUMENTS

JP 2016207105 A 12/2016

* cited by examiner

*Primary Examiner* — Quang N Vo
(74) *Attorney, Agent, or Firm* — Canon U.S.A., Inc. IP Division

(57) ABSTRACT

A system including a content management system and a printing system provides a print code issued by the printing system to a terminal based on a user's content printing operation in a virtual space projected and provided using the terminal, and transmits printing data for printing content data corresponding to the user's content printing operation to a printing device in response to reception of a printing request including the print code from the printing device that has received the print code from the terminal.

9 Claims, 22 Drawing Sheets

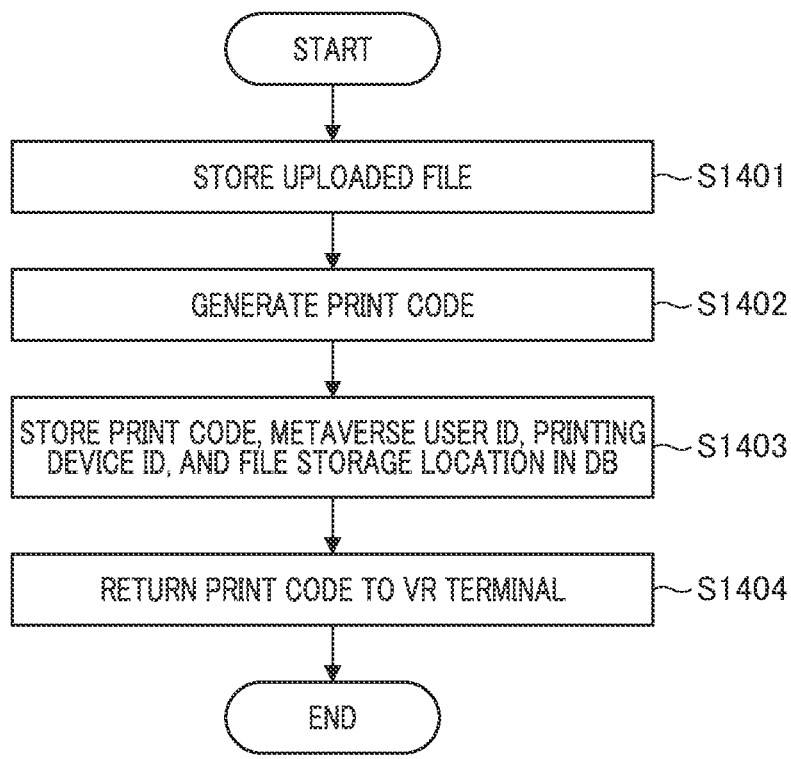

FIG. 16

| Print code | User ID (Metaverse) | Printing device ID | Printing job information |
|---|---|---|---|
| PC0001 | MU0001 | P00001 | Printing job |
| PC0002 | MU0002 | P00002 | Printing job |

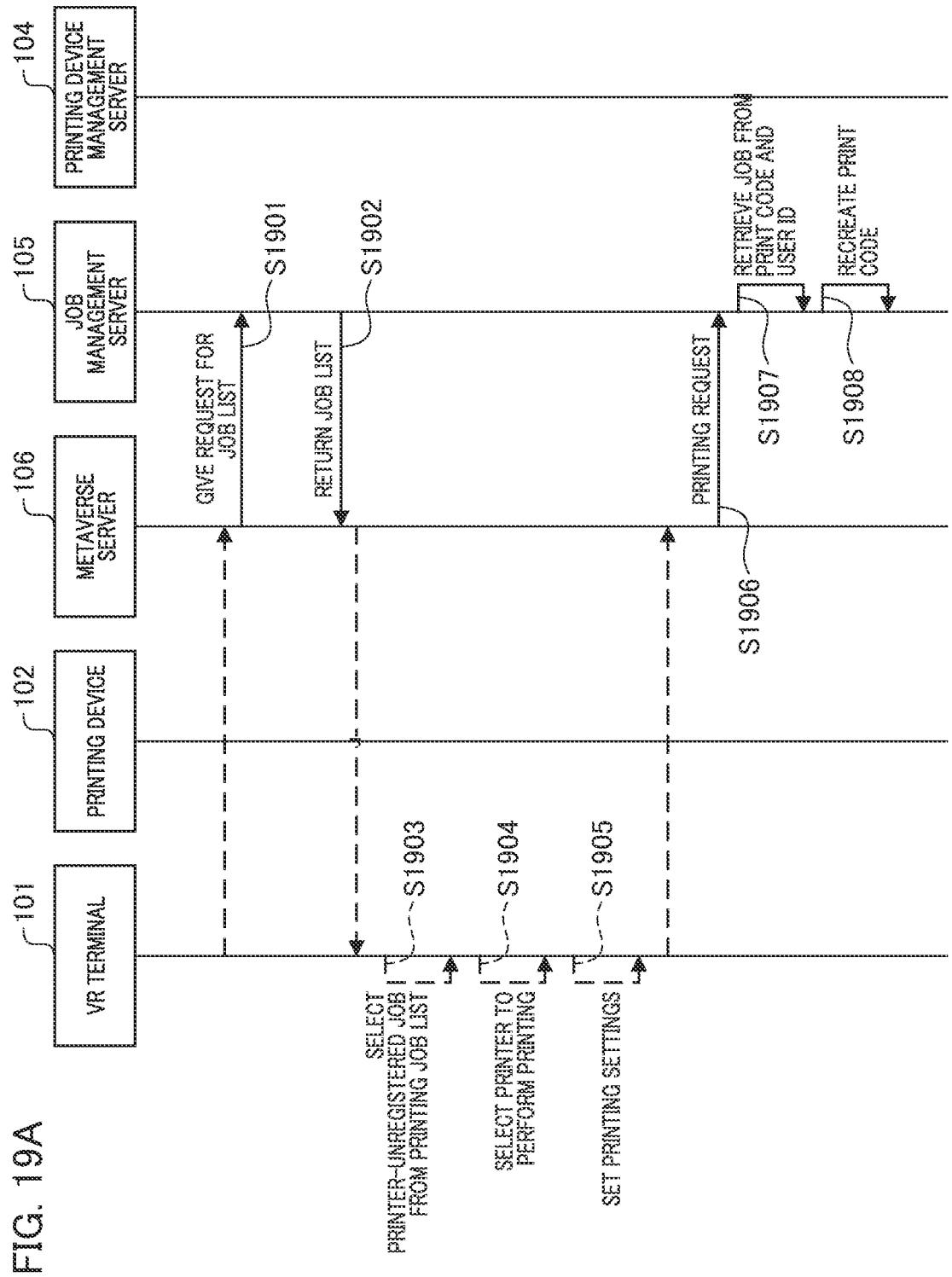

SYSTEM AND SYSTEM CONTROL METHOD

BACKGROUND

Field

The present disclosure relates to a system for printing electronic data provided in a metaverse space and a control method therefor.

Description of the Related Art

In recent years, there has been a rapid spread of remote working, telecommuting, and the like in which work is performed by connecting to a company's intranet environment from home without going to work and handling in-house materials on a PC at home. Vendors are starting to pay attention to the development of workspaces in the metaverse space.

In the metaverse space, VR terminals are used. VR is an abbreviation of Virtual Reality. Due to an improvement in the technical capabilities of the VR terminals themselves, users are now able to obtain a sense of immersion that cannot be compared with before. For example, VR terminals have made it possible to obtain more comfortable spaces for participating in and concentrating on meetings by using avatars. In the future, the number of users is expected to increase in terms of business, such as VR terminals and workspaces in the Metaverse space. As a result, it is expected that there will be a growing need to print products in the Metaverse space in a physical space.

As described above, when printing from the metaverse space is executed, there is a risk of information leakage. For example, when an unspecified number of users connect their home printing devices to the Metaverse space and use them, a printing execution command may be issued to a printing device controlled by another user. In this case, there is a possibility that a product such as an idea created in the metaverse will be output from another user's printing device.

On the other hand, it is conceivable to input a print code linked to a printing job to a printing device (for example, Japanese Patent Application Laid-Open No. 2016-207105). This is a pull-print method in which a printing job issued by a user can be output only by a printing device to which a print code is input, and safe printing is performed.

However, assuming that work is performed in the metaverse space by using a VR terminal, the pull-print method of inputting a print code will be a complicated procedure. This is because, after obtaining the print code, the VR terminal is removed temporarily, and then the print code has to be input to the printing device.

SUMMARY

In the present disclosure, safe printing is performed without impairing a user experience when using a VR terminal.

According to an aspect of the present disclosure, a system includes a content management system and a printing system. The printing system includes a memory storing instructions and a processor. The processor is configured to execute the instructions to cause the printing system to provide a print code issued by the printing system to a terminal based on a user's content printing operation in a virtual space projected and provided using the terminal, and transmit printing data for printing content data corresponding to the user's content printing operation to a printing device in response to reception of a printing request including the print code from the printing device that has received the print code from the terminal.

Further features of the present disclosure will become apparent from the following description of exemplary embodiments with reference to the attached drawings.

BRIEF DESCRIPTION OF THE DRAWINGS

FIG. 14 is a flowchart illustrating processing from storage of a file to returning of a print code in the job management server according to the first embodiment.

FIG. 16 is a diagram illustrating an example of a printing job information DB stored in the job management server according to the first embodiment.

FIGS. 19A and 19B are a sequence diagram illustrating a flow of printing processing executed by the system according to the second embodiment.

DESCRIPTION OF THE EMBODIMENTS

First Embodiment

Embodiments of the present disclosure will be described below with reference to the drawings. The following embodiments do not limit every embodiment according to the claims, and not all combinations of features described in the embodiments are essential to the solutions of the disclosure.

<Configuration of PRINTING SYSTEM in Metaverse>

Figure 1:
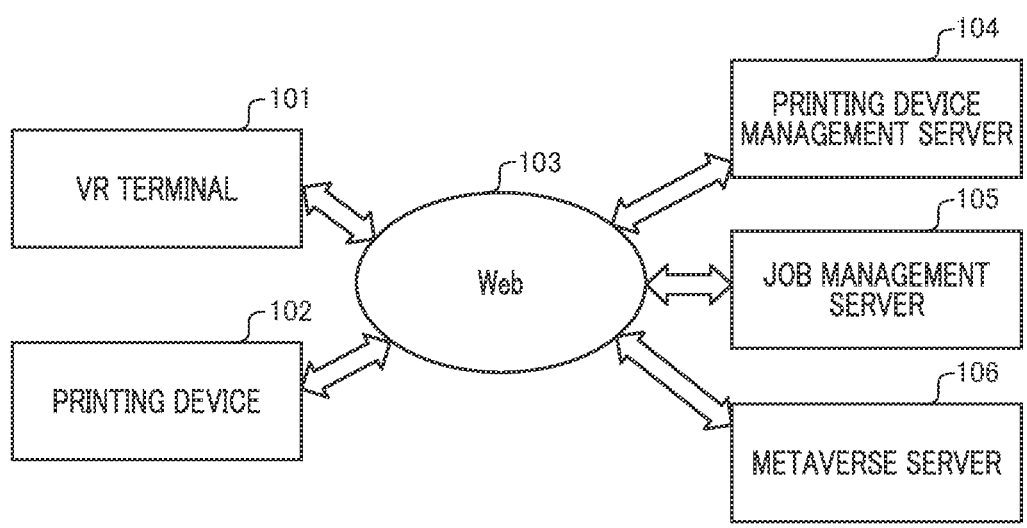
FIG. 1 is a configuration diagram of a printing system in the metaverse.

FIG. 1 is a configuration diagram of a printing system in the metaverse. As illustrated in FIG. 1, the printing system in the present embodiment includes a VR terminal 101, a printing device 102, a printing device management server 104, a job management server 105, and a metaverse server 106. The VR terminal 101 is hardware, such as a head-mounted display, which supports rendering of virtual objects such as the metaverse space. In the present embodiment, the printing device management server 104 and the job management server 105 are examples of a printing system that manages printing information. The metaverse server 106 is an example of a content management system that manages content to be printed.

The VR terminal 101, the printing device 102, the printing device management server 104, the job management server 105, and the metaverse server 106 are connected to the Internet (Web 103). Each of them can transmit and receive information via the Internet (Web 103). Communication is controlled through HTTP, XMPP, or the like. As for a protocol, other protocols may be used.

<Hardware Configuration of VR Terminal>

Figure 2:
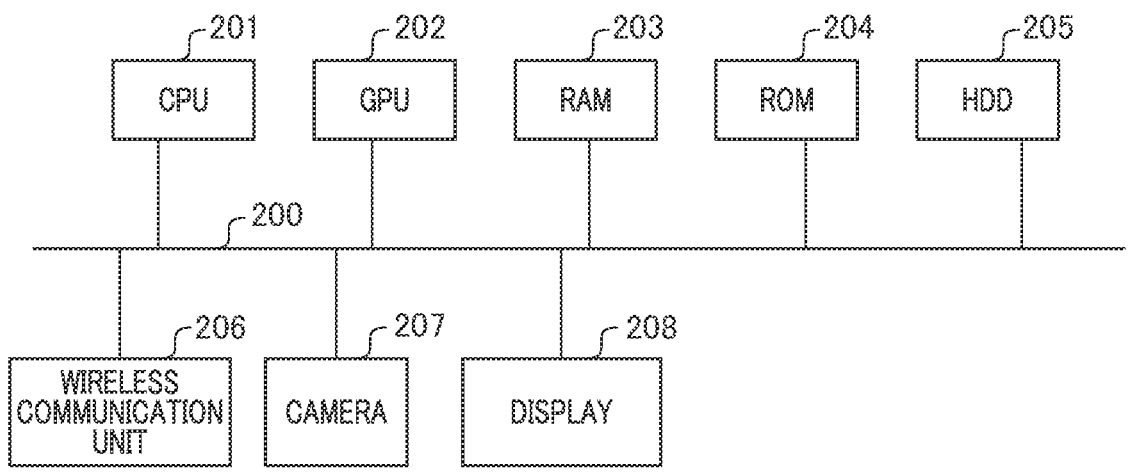
FIG. 2 is a hardware configuration diagram of a VR terminal.

FIG. 2 is a hardware configuration diagram of the VR terminal 101. The VR terminal 101 includes a CPU 201, a GPU 202, a RAM 203, a ROM 204, an HDD 205, a wireless communication unit 206, a camera 207, and a display 208. The VR terminal 101 in the present embodiment is an example of a terminal capable of providing a virtual space by projection. The VR terminal 101 can receive a content printing operation from a user in the virtual space.

The CPU 201 controls the entire device. The CPU 201 executes application programs, an OS, and the like stored in the HDD 205. CPU stands for Central Processing Unit. HDD stands for Hard Disk Drive. OS stands for Operating System. The CPU 201 also performs control of temporarily storing information, files, and the like required to execute programs in the RAM 203.

The GPU 202 performs arithmetic processing necessary for rendering of virtual objects such as the metaverse space in real time. GPU stands for Graphics Processing Unit.

The RAM 203 is a temporary storage unit, and functions as a main memory, a work area, and the like of the CPU 201 and the GPU 202. RAM stands for Random Access Memory.

The ROM 204 is a storage unit, and stores various data, such as basic I/O programs, therein. ROM stands for Read Only Memory.

The HDD 205 is one of external storage units, functions as a large-capacity memory, and stores application programs, such as web browsers, service server group programs, OS, related programs, and the like.

The wireless communication unit 206 is connected to a network such as the Internet and performs various communications. The camera 207 captures a video of the surroundings of the VR terminal 101. The display 208 is a screen display unit, and displays virtual objects. such as the metaverse space; information required for operations; and the like.

<Software Configuration of VR Terminal>

Figure 3:
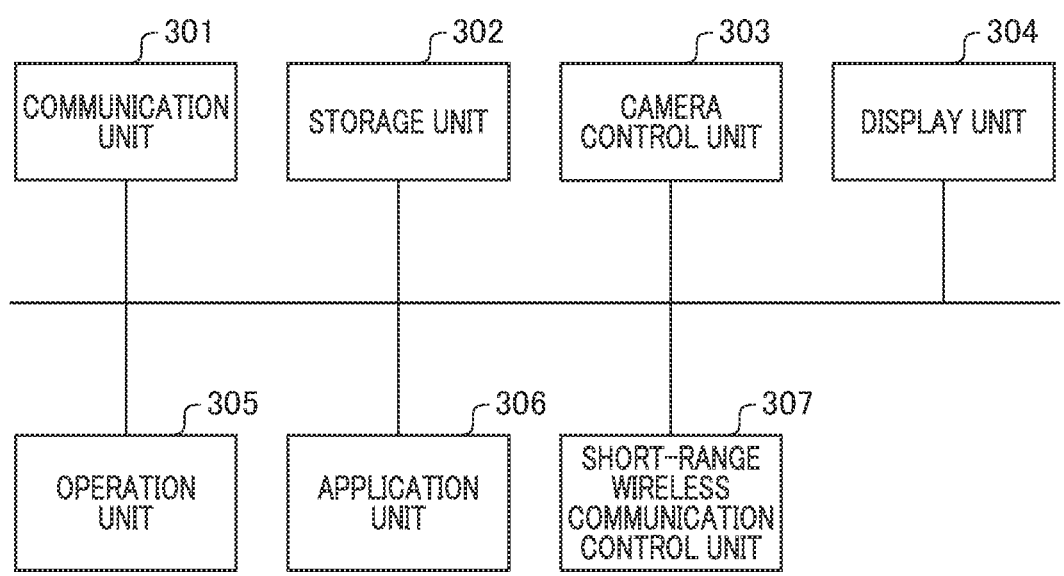
FIG. 3 is a software configuration diagram of a VR terminal.

FIG. 3 is a software configuration diagram of the VR terminal 101. The software is stored as a program in the ROM 204 described in FIG. 2, loaded to the RAM 203 at the time of execution thereof, and executed in the CPU 201.

A communication unit 301 transmits and receives data to and from an external server via a network. A storage unit 302 performs control of storing an OS to be started up in the VR terminal 101, web browsers, data of installed applications, and the like in the ROM 204.

A camera control unit 303 receives and controls image data acquired from the camera 207. A display unit 304 displays results of the OS, the web browsers, and the applications on the display 208. For example, the display unit 304 controls the display of virtual objects, such as the Metaverse space.

An operation unit 305 receives and controls operations of the VR terminal 101 itself, gestures made by the user through the display unit 304, and operations with an attached controller. For example, the operation unit 305 receives and controls operations, such as displaying a Web browser, by physically double-tapping the VR terminal 101 itself or closing an application. The operation unit 305 projects an OS menu onto a real-world image acquired by the camera control unit 303 by using technology such as AR, and receives and controls operations, such as opening the projected menu, by tapping it with the user's hand. AR stands for Augmented Reality.

An application unit 306 controls applications installed on the OS of the VR terminal 101. User information handled by an application, code information for identifying data, and the like are stored in the ROM 204 in association with the storage unit 302.

A short-range wireless communication control unit 307 controls the wireless communication unit 206 and acquires peripheral device information through local communication. The short-range wireless communication control unit 307 controls transmission and reception of data to and from a peripheral device. When short-range wireless communication is performed from an application, the short-range wireless communication control unit 307 transmits and receives data to and from a peripheral device in association with an application unit.

<Hardware Configuration of Printing Device>

Figure 4:
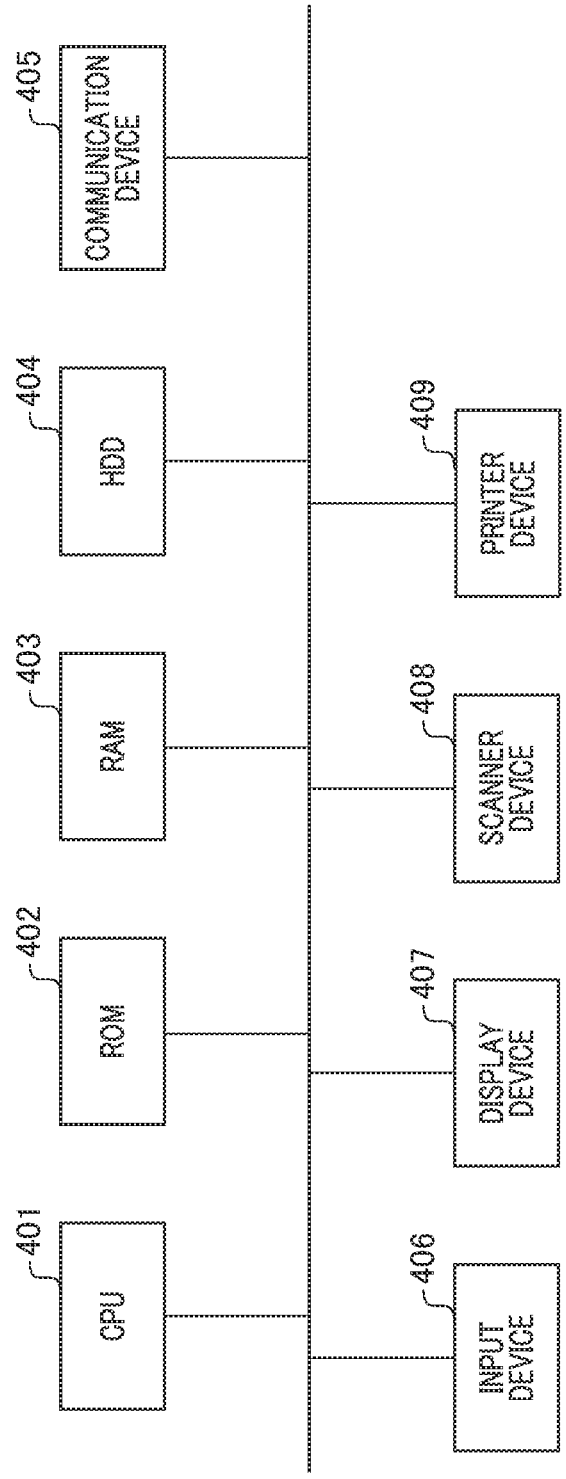
FIG. 4 is a hardware configuration diagram of a printing device.

FIG. 4 is a hardware configuration diagram of the printing device 102. The printing device 102 includes a CPU 401, a ROM 402, a RAM 403, an HDD 404, a communication device 405, an input device 406, a display device 407, a scanner device 408, and a printer device 409.

The CPU 401 comprehensively controls each piece of hardware, and executes each function, such as printing and scanning. The ROM 402 is a data read-only memory, and stores, for example, a basic control program for the printing device. The RAM 403 is a data readable/writable memory, and is used as a working memory for the CPU 401, for example. The HDD 404 is used as a storage area for temporary data during execution of each program and permanent data.

The communication device 405 connects the printing device 102 to a LAN or the Internet and enables data communication between devices. The input device 406 is an operation unit for receiving the user's input operation of characters and data. Examples thereof include a keyboard, a mouse, hard keys, and a touch panel.

The display device 407 is a device for displaying various screens, such as a liquid crystal display or a touch panel. The user gives an instruction via the input device 406 on a user interface screen displayed on the display device 407 to give a job execution instruction or the like to the printing device 102.

The scanner device 408 is a device for scanning a document or the like installed on the printing device 102 by the user and converting it into electronic data. The printer device 409 is a device for printing electronic data.

<Software Configuration of Printing Device>

Figure 5:
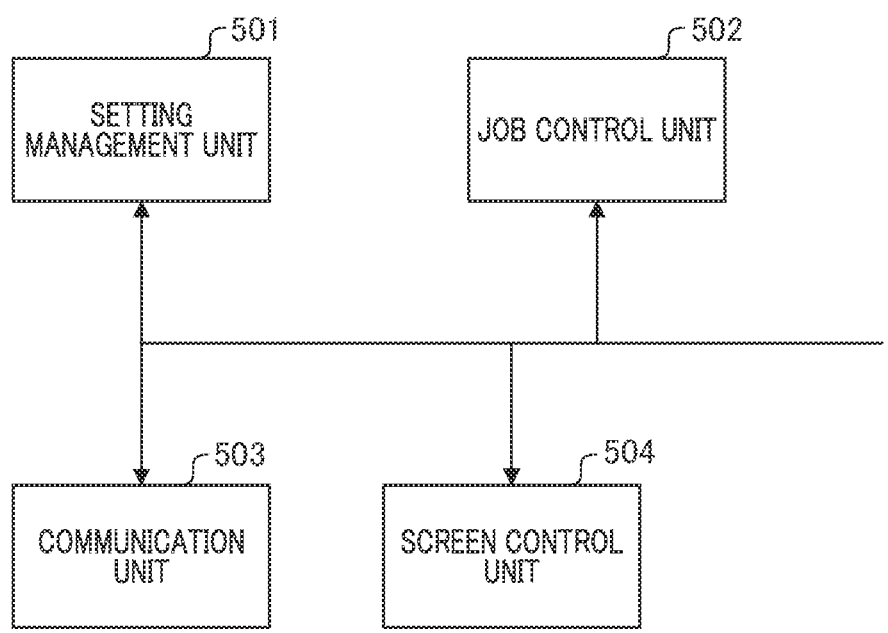
FIG. 5 is a software configuration diagram of a printing device.

FIG. 5 is a software configuration diagram of the printing device 102. Software of the printing device 102 is stored as a program in the ROM 402 described in FIG. 4, loaded to the RAM 403 at the time of execution thereof, and executed in the CPU 401.

A setting management unit 501 stores settings related to the execution of various functions of the printing device 102 in each storage unit, such as the ROM 402 and the HDD 404, and reads them out from each storage unit. Here, the settings related to the execution of various functions include, for example, copy settings for executing a copy function, printing settings for executing a printing function, network settings, and settings for individual identification information.

A job control unit 502 controls the scanner device 408 and the printer device 409 to execute various jobs based on job execution requests input by the input device 406 or received by the communication device 405.

A communication unit 503 receives printing jobs and job execution requests from the printing device management server 104. By communicating with the VR terminal 101, device information and the like are transmitted and received. A screen control unit 504 displays a screen on the display device 407 and receives instructions from the user via the input device 406.

<Hardware Configuration of Server>

Figure 6:
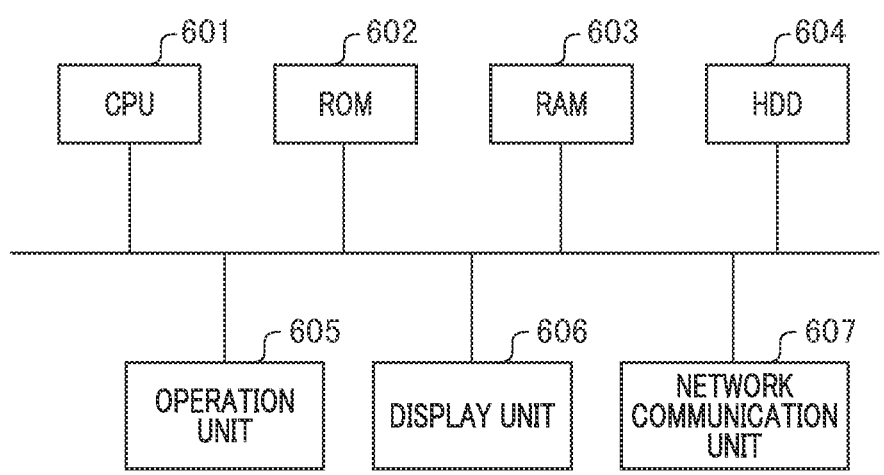
FIG. 6 is a hardware configuration diagram of a metaverse server.

FIG. 6 is a hardware configuration diagram of the metaverse server 106. The metaverse server 106 is a server that manages the metaverse. The metaverse server 106 includes a CPU 601, a ROM 602, a RAM 603, an HDD 604, an operation unit 605, a display unit 606, and a network communication unit 607.

The CPU 601 is a central processing unit for controlling each unit of the metaverse server 106. The ROM 602 is a read-only memory for storing a boot program required for system start-up. The RAM 603 serves as a working memory required when the CPU 601 executes programs. The HDD 604 is a device for storing programs to be executed by the CPU 601 and various information.

The operation unit 605 is constituted by a keyboard, a mouse, and the like for the user to perform various input operations. The display unit 606 is a device for displaying various information, such as a liquid crystal display. The network communication unit 607 is connected to a network, such as the Internet, and performs various communications.

The printing device management server 104 and the job management server 105 have the same hardware configuration as the metaverse server 106, and are given the same reference numerals to omit the description thereof. However, the printing device management server 104 and the job management server 105 may have hardware configurations different from that of the metaverse server 106.

<Software Configuration of Metaverse Server>

Figure 7:
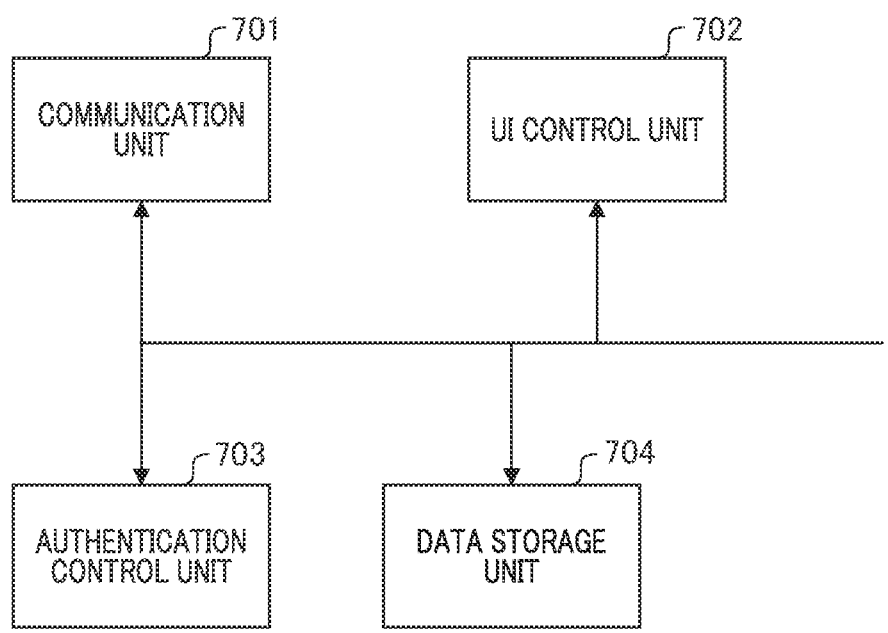
FIG. 7 is a software configuration diagram of a metaverse server.

FIG. 7 is a software configuration diagram of the metaverse server 106. The software of the metaverse server 106 is stored as a program in the ROM 602 described in FIG. 6, loaded to the RAM 603 at the time of execution thereof, and executed in the CPU 601.

A communication unit 701 communicates with the VR terminal 101, the printing device management server 104, and the job management server 105, and transmits and receives each processing request. A UI control unit 702 controls a UI displayed on the VR terminal 101. For example, virtual object information, such as the metaverse space, is created and transmitted to the VR terminal 101 via the communication unit 701.

An authentication control unit 703 performs user management. User information is stored in a data storage unit 704 or a dedicated user management DB, which is not illustrated in the drawing. Also, the user information may be associated with an external authentication service. The data storage unit 704 stores data in response to a request from the authentication control unit 703. Information necessary for creating virtual objects, such as the metaverse space, is stored.

<Software Configuration of Job Management Server>

Figure 8:
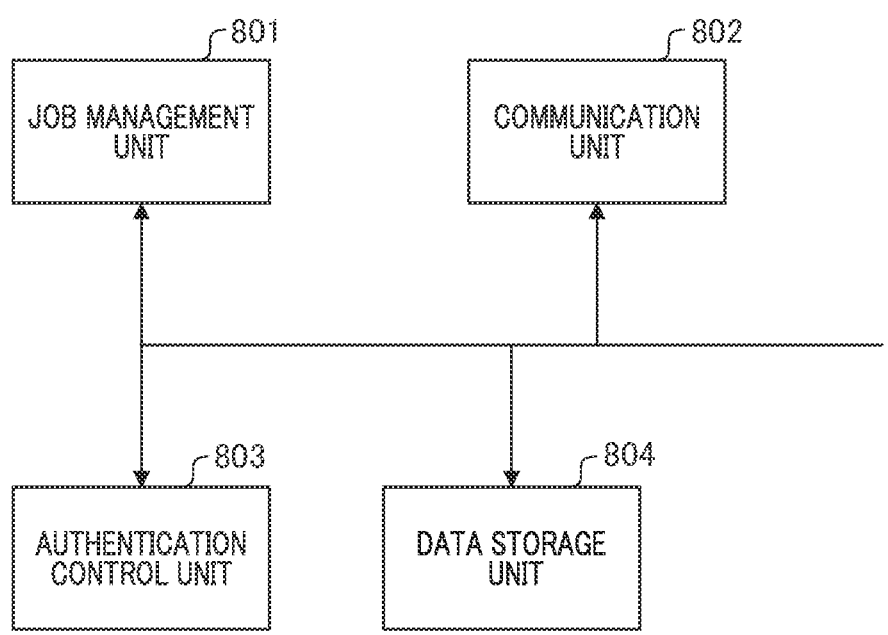
FIG. 8 is a software configuration diagram of a job management server.

FIG. 8 is a software configuration diagram of the job management server 105. Software of the job management server 105 is stored as a program in the ROM 602 described in FIG. 6, loaded to the RAM 603 at the time of execution thereof, and executed in the CPU 601.

A job management unit 801 stores a printing job received from the metaverse server 106 in a data storage unit 804. A communication unit 802 communicates with the printing device 102 and the metaverse server 106 to transmit and receive each processing request.

An authentication control unit 803 performs user management. User information is stored in a data storage unit 804 or a dedicated user management DB, which is not illustrated in the drawing. Also, the user information may be associated with an external authentication service.

The data storage unit 804 stores data in response to a request from the job management unit 801 or the authentication control unit 803. It is assumed that the printing device management server 104 has the same software configuration as the job management server 105, and a description thereof will be omitted. However, the printing device management server 104 may have a hardware configuration different from that of the job management server 105.

<Conceptual Diagram of System>

Figure 9:
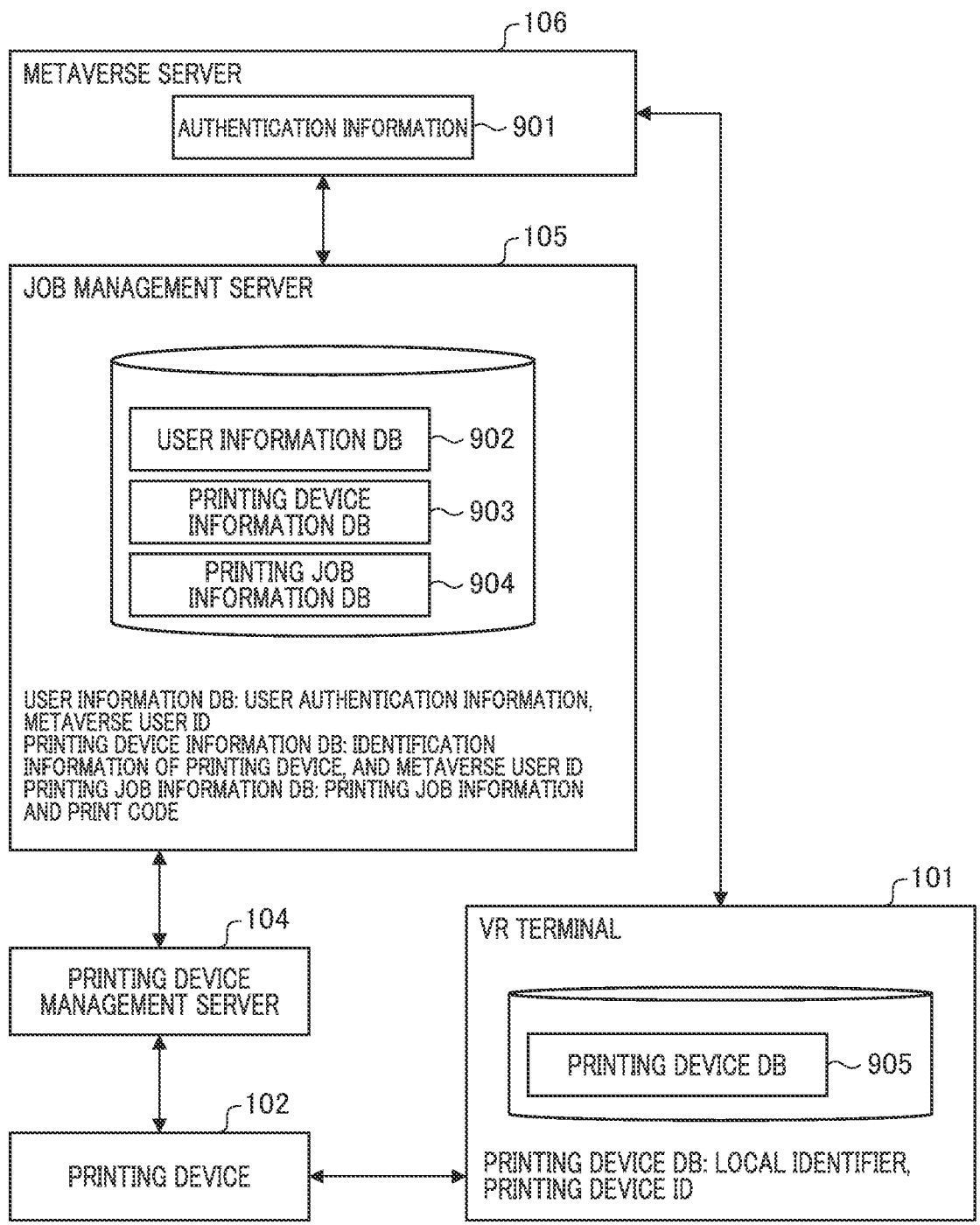
FIG. 9 is a conceptual diagram illustrating a relationship between respective components in a system according to a first embodiment.

FIG. 9 is a conceptual diagram illustrating a relationship between respective components in a system according to the first embodiment. Specifically, FIG. 9 is a conceptual diagram illustrating a relationship between information of the user of the job management server 105, the printing device 102, the printing device management server 104, the metaverse server 106, and the VR terminal 101 according to the embodiment.

A printing device ID is transferred from the VR terminal 101 to the job management server 105 via the metaverse server 106 when a printing job creation request is transmitted. The printing device ID is stored in a printing device database (DB) 905 in the VR terminal 101. The printing device ID stores information corresponding to a value for identifying the printing device 102 on a local network. The value for identifying the printing device 102 may be any IP or terminal name that can be uniquely identified.

A user information database (DB) 902 stores user authentication information 901 and a metaverse user ID in association with each other. The metaverse user ID may be an ID for identifying a user managed on the metaverse, or any information, such as the serial number of the VR terminal 101, by which a user can be uniquely identified.

A printing device information database (DB) 903 stores information indicating association between a printing device and a user. Specifically, the printing device information database (DB) 903 stores identification information (ID) of the printing device 102 and a metaverse user ID in association with each other.

A printing job information database (DB) 904 stores a user ID, identification information of the printing device 102, and a print code in association with each other. When the job management server 105 receives a print code from the printing device 102, the job management server 105 creates a printing job corresponding to the print code.

<Sequence Diagram of Printing Device Registration>

Figure 10:
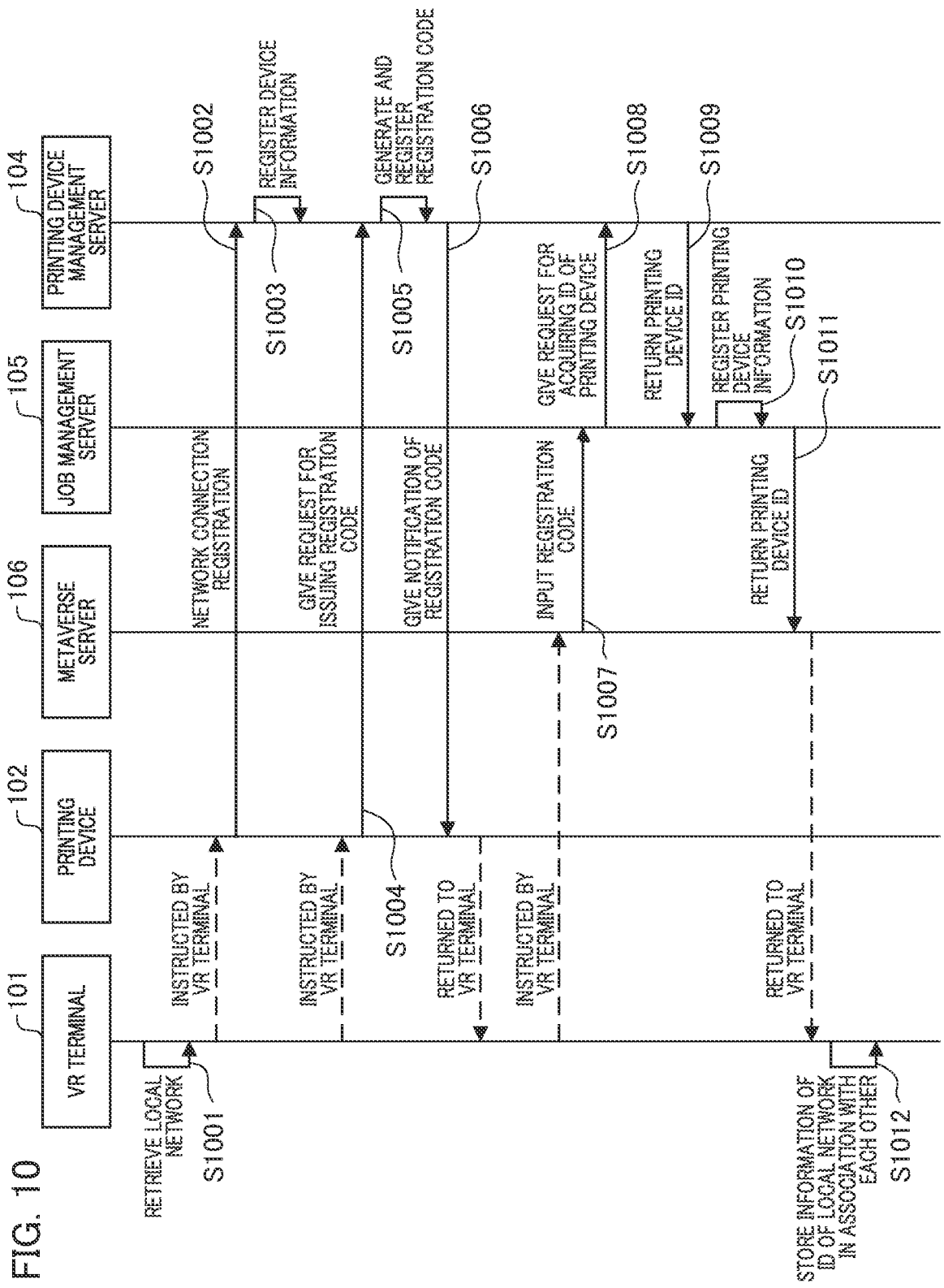
FIG. 10 is a sequence diagram illustrating a flow of registration processing of a printing device which is executed by the system according to the first embodiment.

Description will be given of registration processing for associating a user with the printing device 102 so that the user can use a printing system. FIG. 10 is a sequence diagram illustrating a flow of registration processing of the printing device, which is executed by the system according to the first embodiment. The registration processing of the printing device is executed between the VR terminal 101, the printing device 102, the printing device management server 104, the job management server 105, and the metaverse server 106. Hereinafter, each processing step will be described with an initial letter S attached.

In S1001, the VR terminal 101 performs retrieval in a connected local network and acquires information on a connectable printing device 102. The user selects the connectable printing device 102 and performs an operation using the VR terminal 101.

In S1002, when the user performs an operation from the VR terminal 101 and the printing device 102 is connected to the network, connection information is transmitted from the printing device 102 to the printing device management server 104. In S1003, device information of the printing device 102 is registered in the printing device management server 104. This device information includes identification information of the printing device 102.

In S1004, the printing device 102 requests a registration code of the printing device 102 from the printing device management server 104. In S1005, the printing device management server 104 generates and issues the registration code and registers a set of the identification information of the printing device 102 and the registration code as registration code information. In S1006, the printing device management server 104 notifies the printing device 102 of the generated registration code and causes the VR terminal 101 to temporarily store the registration code.

In S1007, the VR terminal 101 transmits the stored registration code from the metaverse server 106 to the job management server 105. In S1008, the job management server 105 requests the printing device management server 104 to acquire the ID of the printing device corresponding to the registration code. In S1009, the printing device management server 104 acquires the ID of the printing device 102 based on the registration code and returns the acquired ID to the job management server 105. In S1010, the job management server 105 registers information including the ID of the printing device 102 and a metaverse user ID in the printing device information (DB) 903 based on the returned ID of the printing device 102.

In S1011, when the ID of the printing device 102 is transmitted from the job management server 105 to the metaverse server 106, the information is returned to the VR terminal 101. When the printing device ID arrives at the VR terminal 101, the VR terminal 101 stores information on a set of the identification value of the printing device 102 on the local network and the printing device ID in the printing device database (DB) 905 in S1012.

Figure 11A:
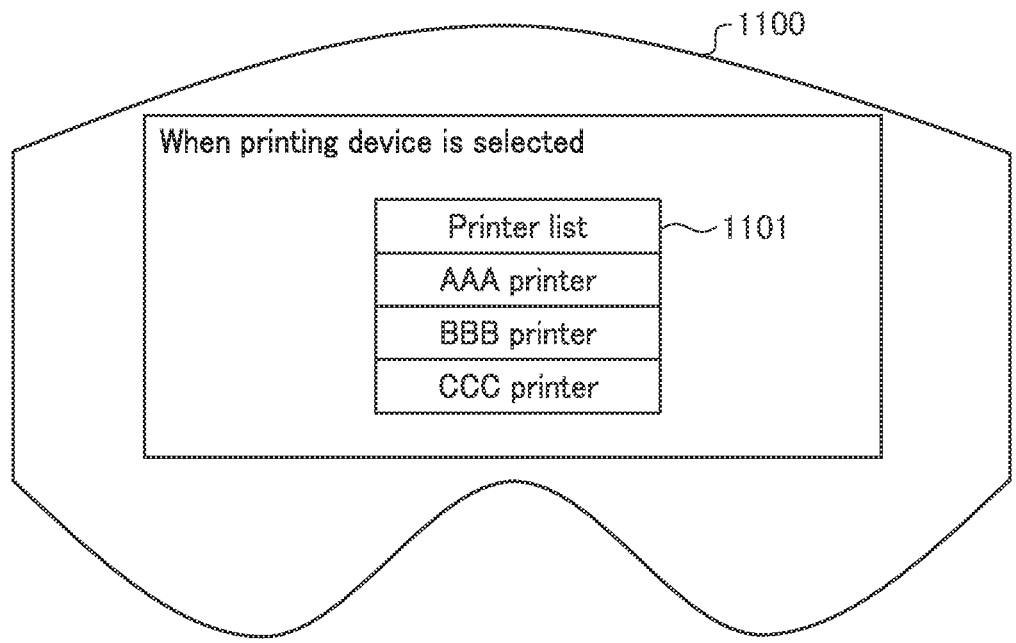
FIGS. 11A and 11B are diagrams illustrating an example of a screen in a VR terminal for operating the printing device.
Figure 11B:
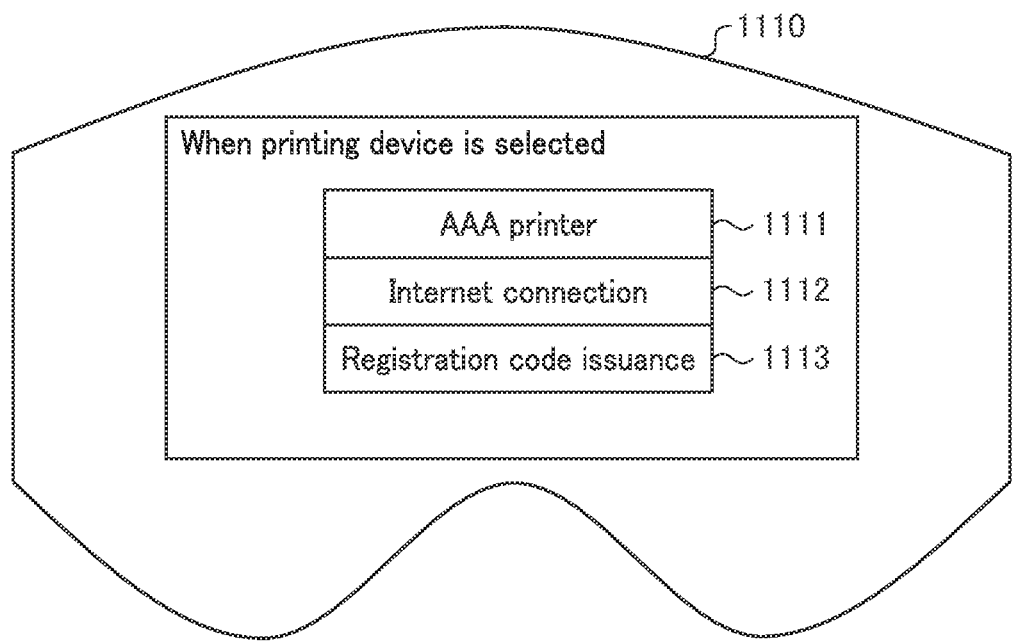

FIGS. 11A and 11B are diagrams illustrating an example of a screen in the VR terminal 101 for operating the printing device 102. FIG. 11A is an example of a screen for selecting a printing device. FIG. 11B is an example of a screen for operating the printing device.

The screen in FIG. 11A is displayed on the display 208 of the VR terminal 101 when the connectable printing device 102 is retrieved from the local network in S1001 in FIG. 10. Thereby, the user can select the printing device 102 to be connected from among the connectable printing devices. A printing device selection screen 1100 shows a GUI framework in the VR terminal 101, and a list of connectable printing devices 102 is displayed in an area 1101. The user selects the printing device 102 on the printing device selection screen 1100 and proceeds to operation.

The screen in FIG. 11B is displayed at a point in time of the network connection registration and the registration code issuance request in S1002 and S1004 of FIG. 10. A printing device operation screen 1110 shows a GUI framework in the VR terminal 101, and buttons for operating the printing device 102 are disposed in an area 1111. When an Internet connection button 1112 is pressed, the printing device 102 is instructed to be connected to the Internet. When a registration code issue button 1113 is pressed, the printing device 102 is requested to issue a registration code to the printing device management server 104.

In this manner, the user of the VR terminal 101 can register the printing device information (DB) 903 in which the printing device 102 and the user are associated with each other in the job management server 105.

<Sequence Diagram of Printing>

Figure 12A:
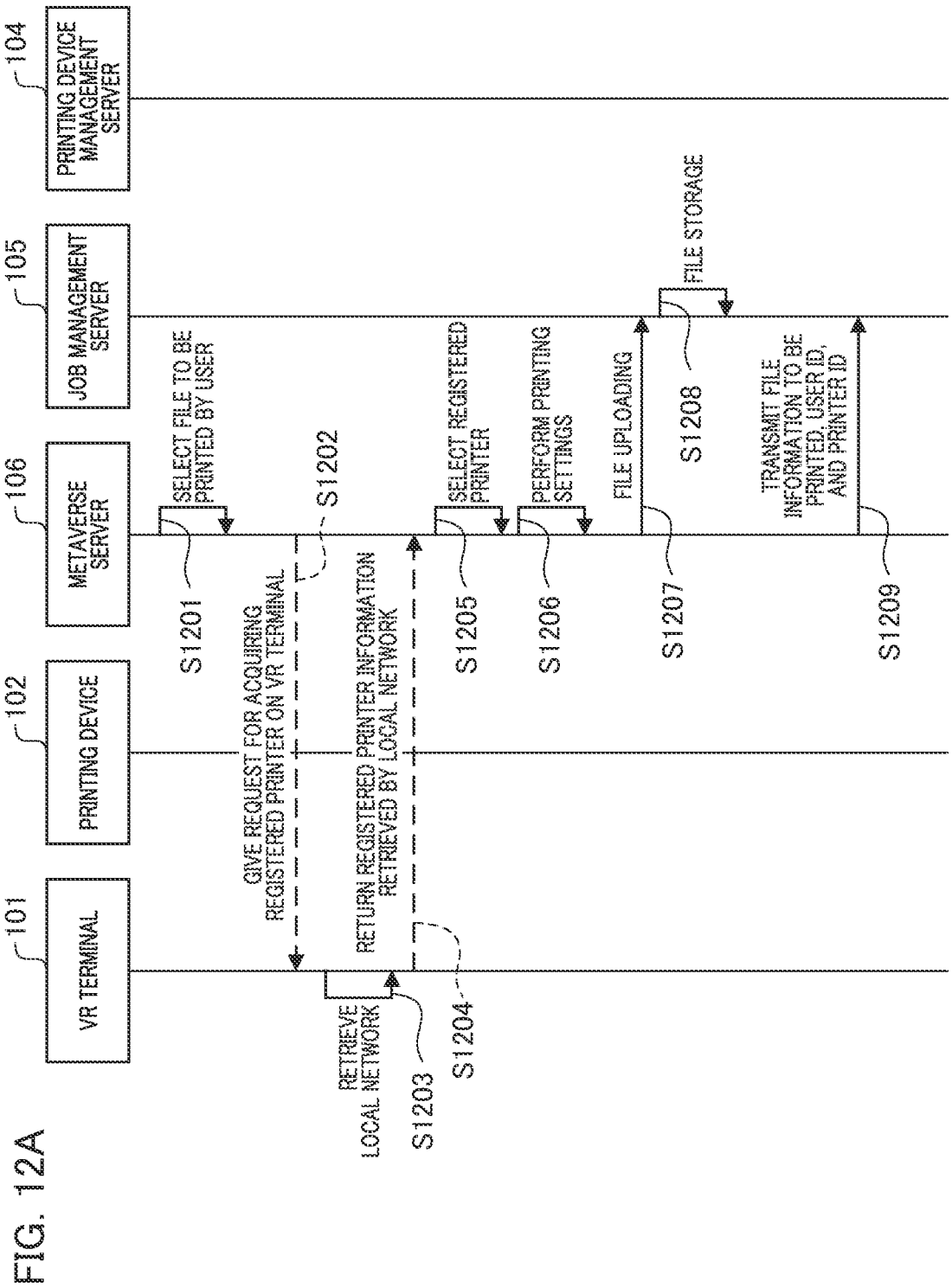
FIGS. 12A and 12B are a sequence diagram illustrating a flow of printing processing executed by the system according to the first embodiment.
Figure 12B:
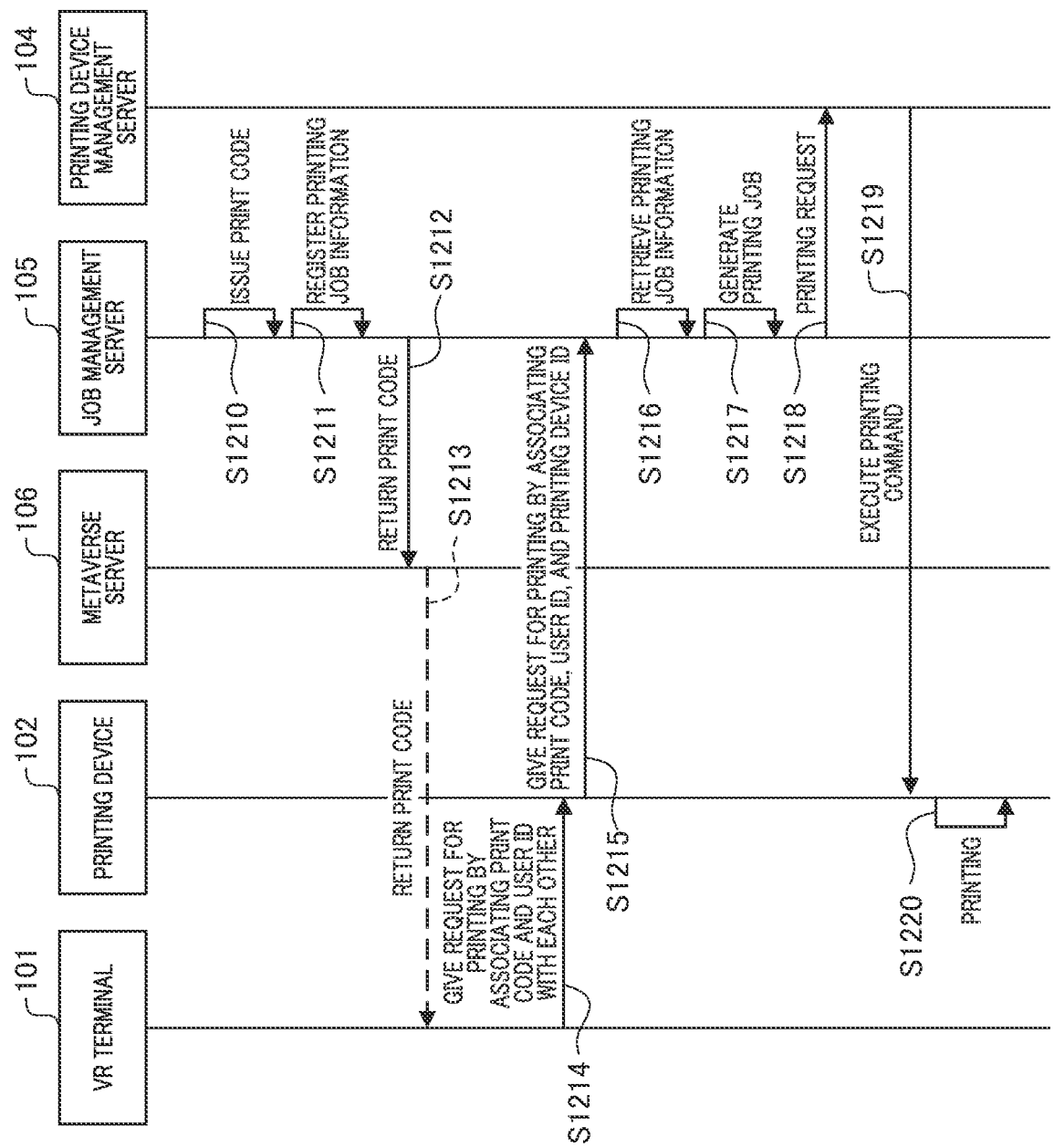

Processing in which the user issues a printing execution command, issues a print code, issues a job, and performs printing will be described. FIG. 12 is a sequence diagram illustrating a flow of printing processing executed by the system according to the first embodiment. The printing processing is executed between the VR terminal 101, the printing device 102, the printing device management server 104, the job management server 105, and the metaverse server 106.

In S1201, the user selects a file to be printed on the metaverse server 106. In S1202, a request is made to obtain the registered printing device information (DB) 905 stored on the VR terminal 101.

In S1203, when the VR terminal 101 receives a printing device information acquisition request, the VR terminal 101 retrieves a connected local network. In S1204, a list of connectable printing devices 102 stored in the printing device database (DB) of the VR terminal 101 is returned to the metaverse server 106.

In S1205, the user selects a printing device 102 to be printed from the returned list. In S1206, the user performs printing settings. In S1207, the file selected in S1201 is uploaded to the job management server 105. In S1208, the job management server 105 stores the file.

In S1209, the metaverse server 106 transmits the printing settings, file information, a metaverse user ID (user identification information), and a printing device ID (printing device identification information) to the job management server 105, and gives a request for issuing a print code. In S1210, the job management server 105 issues a print code. Print code information is registered in the job management server 105 in S1211. In S1212, the job management server 105 returns the print code to the metaverse server 106. The CPU 601 of the job management server 105 in the present embodiment is an example of a registration unit for registering the print code, the user identification information, and the printing device identification information in association with each other in the processing of S1211. The CPU 601 of the job management server 105 is an example of a providing unit for providing the print code to a terminal in the processing of S1212.

In S1213, the VR terminal 101 receives the print code returned to the metaverse server 106. In S1214, the VR terminal 101 transmits the print code and the metaverse user ID to the printing device 102 selected in S1205. In S1215, when the printing device 102 receives the print code and the metaverse user ID, the printing device 102 transmits a printing request to the job management server 105 together with the printing device ID. For this reason, the printing request in the present embodiment is information associated with the metaverse user ID and the printing device ID.

In S1216, the job management server 105 retrieves a file related to the print code from the print code described above in response to the reception of the printing request including the print code. In S1217, the job management server 105 generates a printing job based on the retrieved file. In S1218, the job management server 105 transmits the generated printing job, the ID of the printing device, and a printing request to the printing device management server 104.

In S1219, the printing device management server 104 issues a printing command to the printing device 102 corresponding to the ID based on the printing job. The CPU 601 of the job management server 105 in the present embodiment is an example of a transmission unit for transmitting printing data for printing content data corresponding to a content to the printing device in the processing of S1219.

In this manner, in S1220, the file uploaded by the user from the metaverse server 106 is registered on the VR terminal 101 by the user and printed by the printing device 102 that exists on the local network.

Figure 13A:
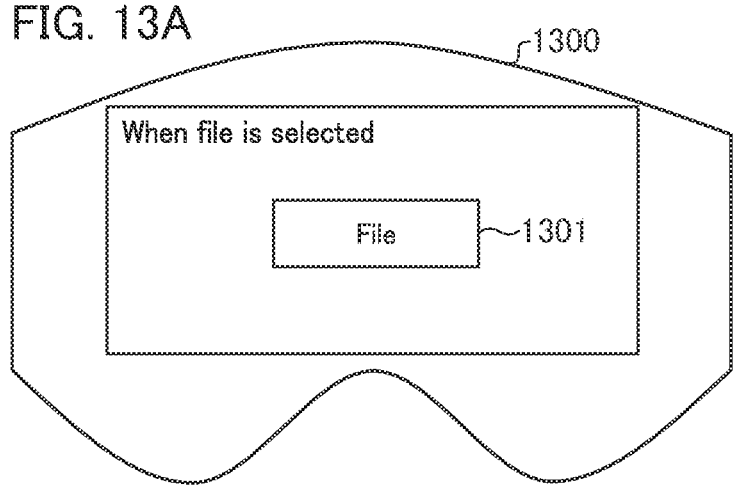
FIGS. 13A to 13C are diagrams illustrating examples of screens for performing a printing operation on the VR terminal according to the first embodiment.
Figure 13B:
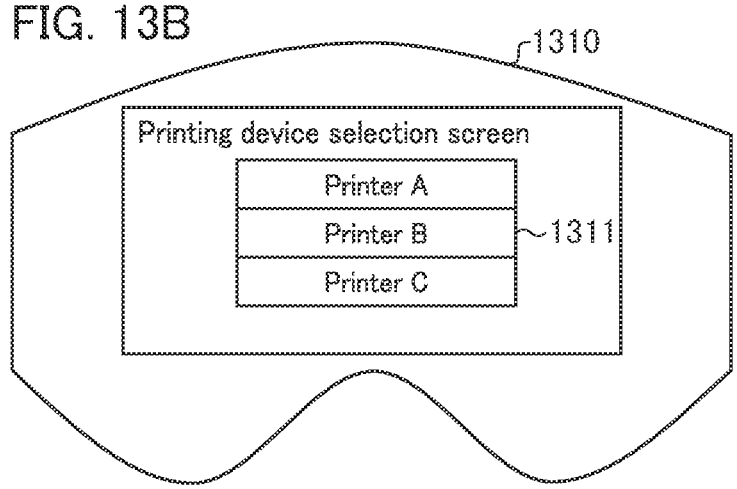
Figure 13C:
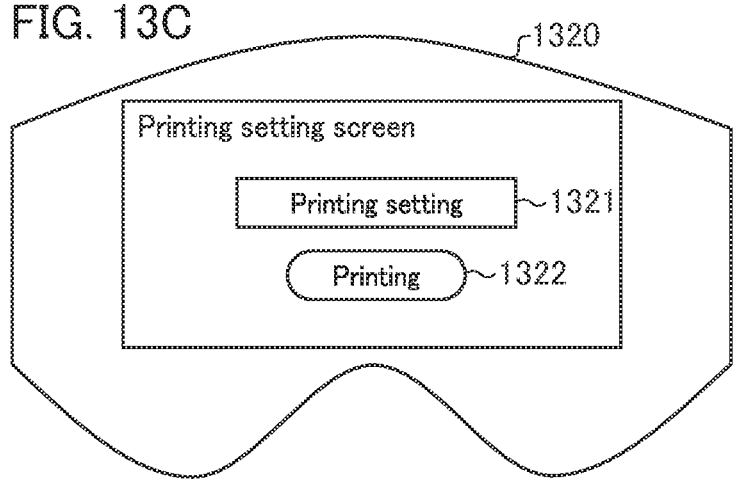

FIGS. 13A to 13C are diagrams illustrating examples of screens for performing a printing operation on the VR terminal 101 according to the first embodiment. FIG. 13A is an example of a screen for selecting a file to be printed. FIG. 13B is an example of a screen for selecting a printing device. FIG. 13C is an example of a screen for selecting printing settings.

The screen in FIG. 13A is displayed on the display 208 of the VR terminal 101 when the user selects a file on the metaverse server 106 in S1201 of FIG. 12. A file selection screen 1300 shows a GUI framework in the VR terminal 101, and a file to be printed is displayed in an area 1301. When the user selects the file displayed in the area 1301 and instructs printing, the screen moves to a printing device selection screen.

In S1205 of FIG. 12, the screen in FIG. 13B is displayed at a point in time when the user selects a printing device to be used from the list of registered printing devices. A printing device selection screen 1310 shows a GUI framework in the VR terminal 101, and a list of available printing devices is displayed in an area 1311. When the user selects a printing device from the list, the screen moves to a printing setting screen.

The screen in FIG. 13C is displayed at a point in time when a printing setting to be used is selected in S1206 of FIG. 12. A printing setting screen 1320 shows a GUI framework in the VR terminal 101, and a printing setting 1321 includes the number of print copies, a paper size, a layout, a double-sided printing setting, a printing color setting, a printing range, and the like. Information displayed in the printing setting 1321 is not limited to the number of pint copies, the paper size, the layout, the double-sided printing setting, the printing color setting, and the printing range. The printing setting may be equipped with a function of receiving an input in an input box or a selection box. Thus, the user uploads the file and edits the settings by the printing setting 1321. When the user presses the printing button 1322, the job management server 105 can issue a printing job and execute printing.

<Flowchart of Print Code Generation>

FIG. 14 is a flowchart illustrating processing from storage of a file to returning of a print code in the job management server 105 according to the first embodiment. The processing in FIG. 12 corresponding to FIG. 14 is shown in parenthesis. The processing in FIG. 14 starts when the user uploads a file using the VR terminal 101 (S1207). Each processing is performed by the CPU of the job management server 105.

In S1401, the job management server 105 stores the uploaded file (S1208). When information for printing is requested (S1209), the job management server 105 generates a print code in S1402 (S1210).

In S1403, the job management server 105 stores printing job information in the printing job information DB 904 (S1211). The printing job information in the present embodiment is stored as the printing job information DB 904 together with the generated print code, a metaverse user ID, a printing device ID, and a file storage location. In S1404, the job management server 105 returns the generated print code to the VR terminal 101 (S1213) and terminates this processing.

<Flowchart of Printing>

Figure 15:
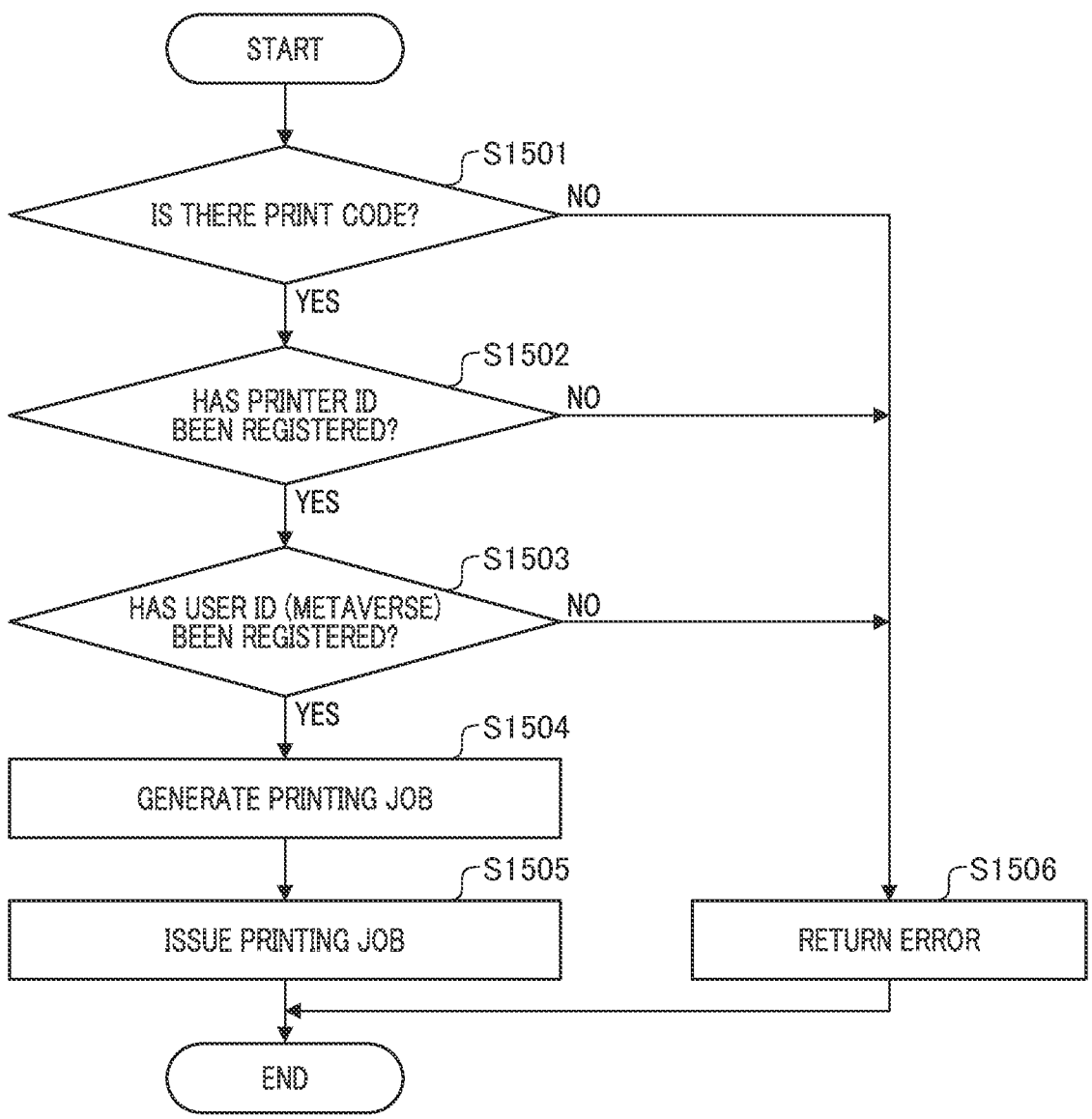
FIG. 15 is a flowchart illustrating processing from reception of a print code to issuance of a printing job in the job management server according to the first embodiment.

FIG. 15 is a flowchart illustrating processing from reception of a print code to issuance of a printing job in the job management server according to the first embodiment. The processing in FIG. 12 corresponding to FIG. 15 is shown in parentheses. The processing in FIG. 15 starts when a print code is transmitted from the VR terminal 101 and the job management server 105 receives the print code from the printing device 102 (S1215). Each processing is performed by the CPU of the job management server 105.

In S1501, the job management server 105 retrieves the printing job information DB 904 based on an input code value and determines whether the print code is registered in the printing job information DB 904 (S1216). When it is determined in S1501 that the input print code is not registered in the printing job information DB 904, the processing of 51506 is performed. In 51506, the job management server 105 transmits an error code to the printing device 102 and terminates this processing. On the other hand, when it is determined in S1501 that the print code is registered, the processing of S1502 is performed.

In S1502, it is determined whether the ID of the printing device is registered in the printing job information DB 904. When it is determined in S1502 that the ID of the printing device 102 is not registered, the processing of 51506 is performed. In 51506, the job management server 105 transmits an error code to the printing device 102 and terminates this processing. On the other hand, when it is determined in S1502 that the ID of the printing device 102 is registered, the processing of S1503 is performed. In S1503, it is determined whether a print code has been issued by a user registered in the user information DB 902. When it is determined in S1503 that the print code has been issued by a user registered in the user information DB 902, the processing of S1504 is performed. On the other hand, if not, the processing of 51506 is performed, an error code is transmitted to the printing device 102, and this processing is terminated.

In S1504, the job management server 105 generates a printing job from the stored print code and the printing job information DB 904 (S1217). Next, in S1505, the job management server 105 issues a printing request for the printing job to the printing device management server 104 (S1218) and terminates this processing.

In 51506, different error status codes are generated and transmitted to the printing device 102 according to the cause of each error. Then, the printing device 102 displays an error message based on the error status codes.

<DB Diagram of Printing Job Information>

FIG. 16 is a diagram illustrating an example of the printing job information DB 904 stored (registered) in the job management server 105 according to the first embodiment. The printing job information DB 904 illustrated in FIG. 16 is managed for each print code. A print code, a metaverse user ID, a printing device ID, and printing job information are stored in the printing job information DB 904. Additionally, as described above, a file storage location is also included in the printing job information DB 904.

As described above, according to the present embodiment, a printing job is generated in association with the ID of the printing device 102, user information, and a print code. As a result, when the user transmits the print code and the metaverse user ID from the VR terminal 101 to the printing device 102, the metaverse user ID, the print code and the ID of the printing device 102 are transmitted to the server. The job management server 105 retrieves a target printing job 904 based on the received information, and when the target printing job 904 is found, the job management server 105 issues a printing command for the printing job to the printing device 102.

Thereby, the user can perform printing without the need for complicated authentication work, a separate authentication device, or the like. The user can execute safe printing without an operation of disconnecting the VR terminal 101 once and then inputting it to the printing device 102.

Although an example in which the job management server 105 and the printing device management server 104 are provided has been described in the present embodiment, one server may have functions of these two servers. The printing device management server 104, the job management server 105, and the metaverse server 106 may be service servers provided by different business operators or service servers provided by one or more business operators.

Further, as one embodiment, a printing system including the printing device management server 104 and the job management server 105 can be configured, and the printing system can be provided by, for example, a business operator, such as a vendor of the printing device 102. In this case, the printing device 102, the metaverse server 106, and the like transmit requests and responses to several destinations (URL, and the like) which are set in accordance with the purpose of the printing system without being aware of the internal configuration of the printing system. Since the metaverse server 106 and the printing system are provided by different business operators, it is assumed that a predetermined interface for mutual cooperation necessary for realizing the present embodiment is prepared in advance.

Second Embodiment

Hereinafter, an embodiment of the present disclosure will be described with reference to the drawings. Contents similar to those described above are denoted by the same reference numerals, and descriptions thereof are omitted. In the second embodiment, a procedure of selecting a registered printing device 102 which has been performed in S1205 described above is omitted in response to a case where only a printing job is created and then printed. In this case, a user can create only a printing job and execute printing when the printing device 102 moves to a nearby location.

<Sequence Diagram When Printing Job is Created>

Figure 17:
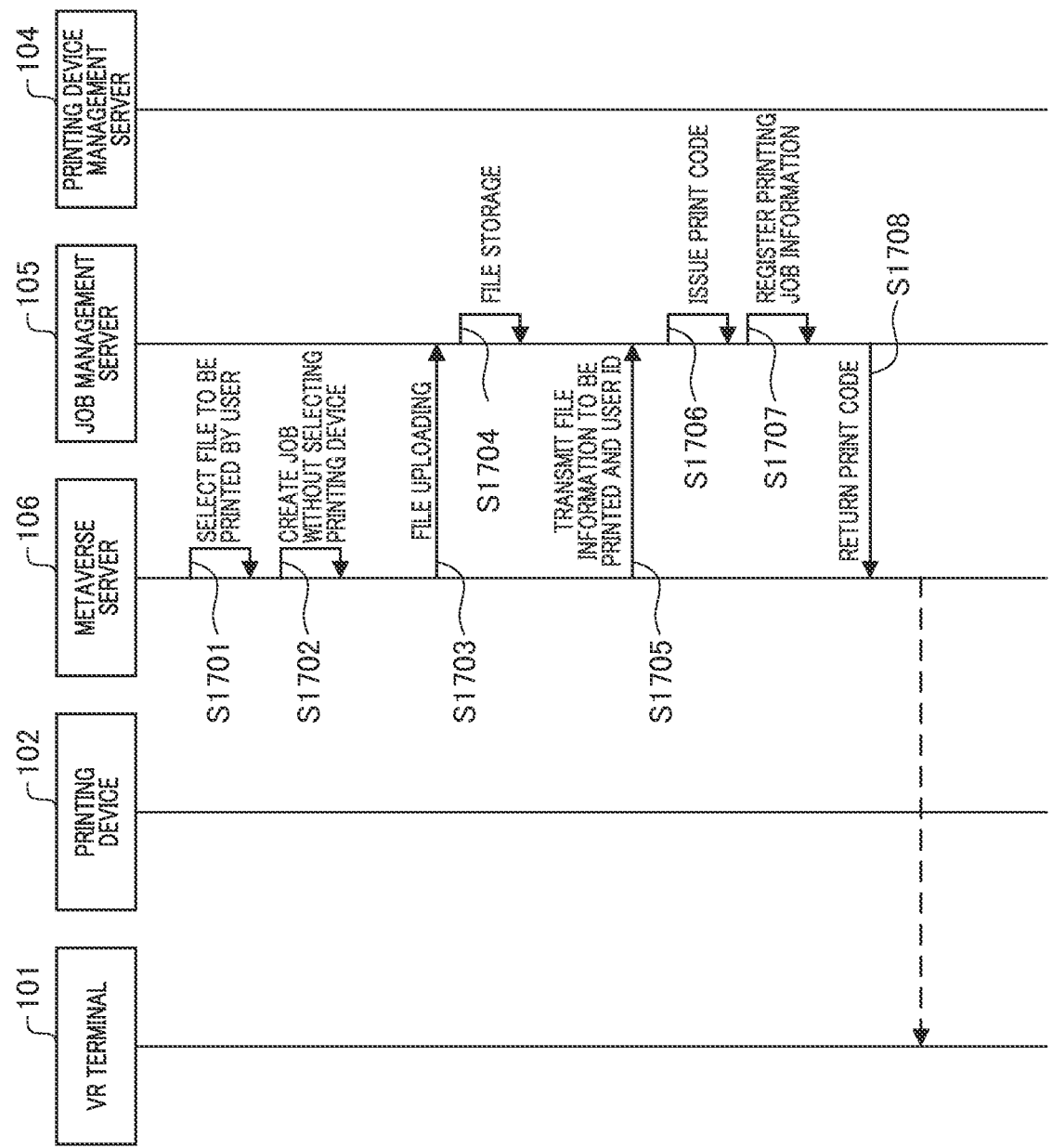
FIG. 17 is a sequence diagram illustrating a flow up to returning of a print code executed by a system according to a second embodiment.

In the second embodiment, description is given of a case where a print code and a job are issued when the user issues a printing execution command. FIG. 17 is a sequence diagram illustrating a flow of printing processing executed by a system according to the second embodiment. The printing processing is executed between a VR terminal 101, a printing device 102, a printing device management server 104, a job management server 105, and a metaverse server 106.

In S1701, the user selects a file to be printed on the metaverse server 106. In S1702, a job is created without selecting the printing device 102. In S1703, the file selected by the user in S1701 is uploaded to the job management server 105. In S1704, the job management server 105 stores the file.

In S1705, the metaverse server 106 transmits file information and a metaverse user ID to the job management server 105, and gives a request for issuing a print code. In S1706, the job management server 105 issues a print code. In S1707, the job management server 105 registers a printing job information DB 904 including the print code in the job management server 105. In S1708, the job management server 105 returns the print code to the VR terminal 101.

Figure 18A:
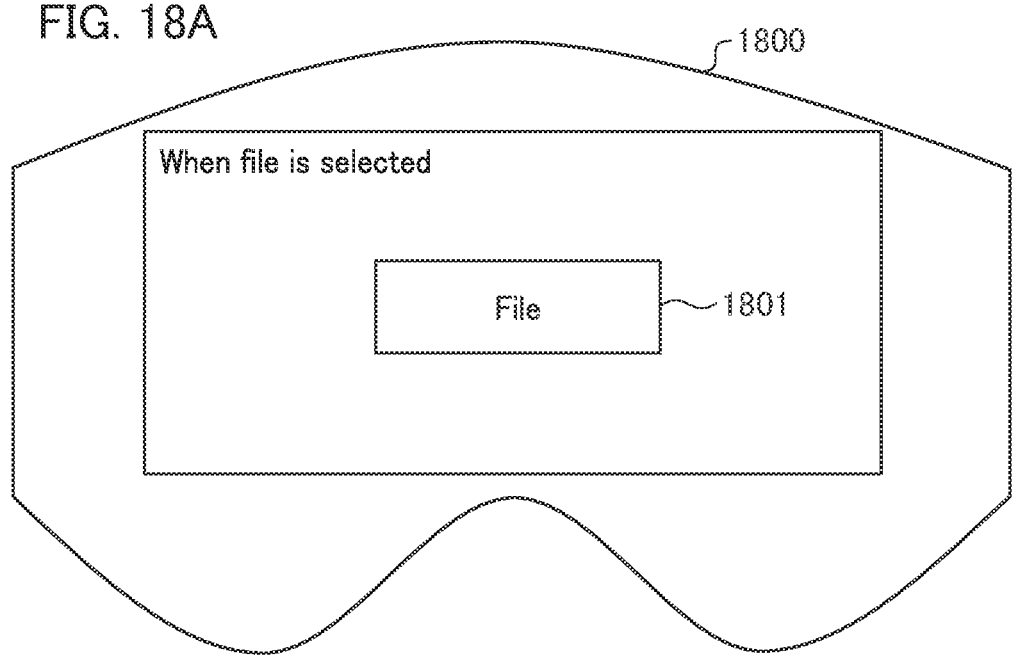
FIGS. 18A and 18B are diagrams illustrating an example of a screen for creating a printing job in a VR terminal.
Figure 18B:
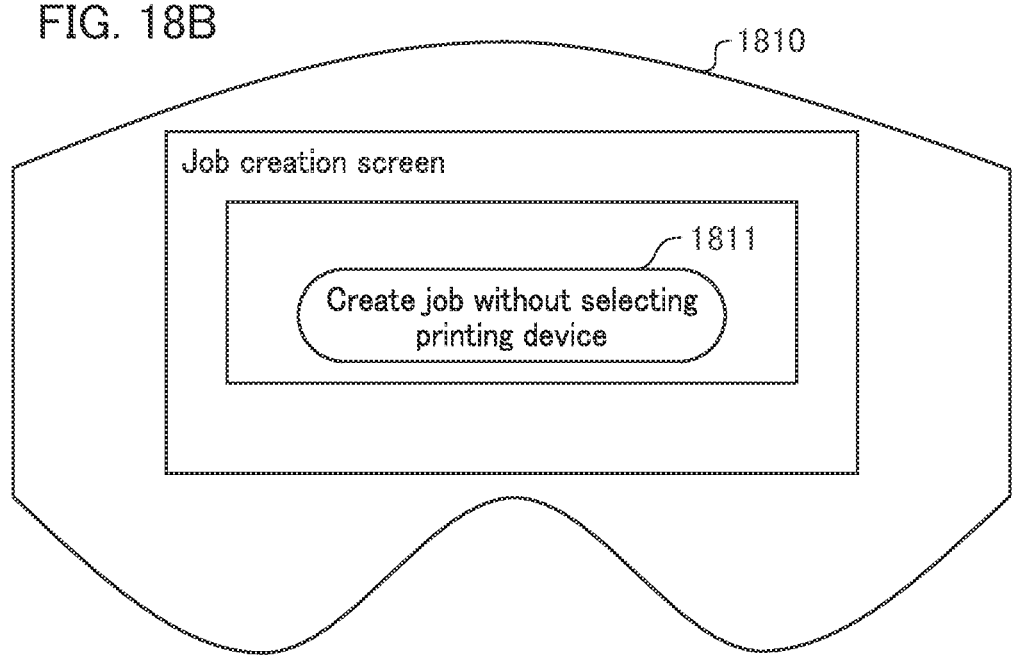

FIGS. 18A and 18B are diagrams illustrating an example of a screen for creating a printing job in the VR terminal 101. FIG. 18A is an example of a screen for selecting a file to be printed. FIG. 18B is an example of a screen for performing job issuance processing without selecting a printing device from the VR terminal.

The screen in FIG. 18A is displayed on a display 208 of the VR terminal 101 when the user selects a file on the metaverse server 106 in S1701 of FIG. 17. A file selection screen 1800 shows a GUI framework in the VR terminal 101, and a file to be printed is displayed in an area 1801. When the user selects a file and instructs printing, the screen moves to a job creation screen.

The screen in FIG. 18B is displayed when the user in S1702 of FIG. 17 gives a request for creating a job without selecting a printing device in the metaverse server 106. A job creation request screen 1810 shows a GUI framework in the VR terminal 101, and a job creation button is displayed without selecting a printing device. The button displayed in the area 1811 is pressed to move to create a printing job.

<Sequence Diagram of Printing>

Figure 19B:
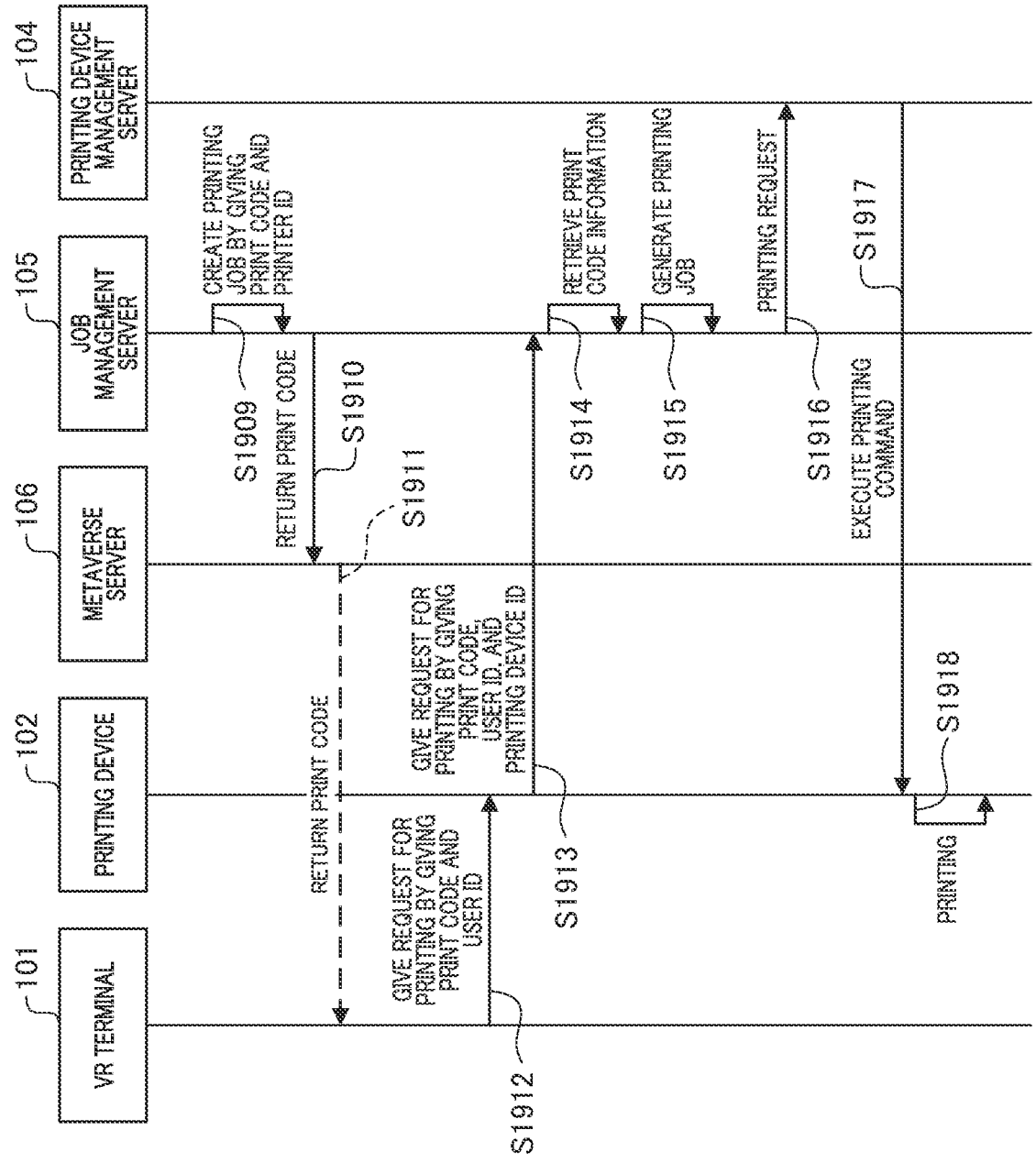

FIG. 19 is a sequence diagram illustrating a flow of printing processing executed by the system according to the second embodiment. The printing processing is executed between the VR terminal 101, the printing device 102, the printing device management server 104, the job management server 105, and the metaverse server 106.

In S1901, the user requests the job management server 105 to acquire a printing job list via the VR terminal 101 and the metaverse server 106. In S1902, the job management server 105 retrieves a list of printing jobs based on a metaverse user ID from the printing job information (DB) 904 and returns the list to the metaverse server 106.

In S1903, the VR terminal 101 selects unprinted data for which the printing device 102 has not been set from the returned printing job list in response to the user's input. In S1904, the VR terminal 101 selects the printing device 102 for printing from the registered printing device list in response to the user's input. In S1905, the VR terminal 101 performs printing settings in response to the user's input.

In S1906, the metaverse server 106 requests the job management server 105 to perform printing. In S1907, the job management server 105 retrieves a target printing job from a print code and a metaverse user ID. In S1908, the job management server 105 recreates a print code. In S1909, the job management server 105 recreates a printing job information (DB) 904 from the recreated print code, a printing device ID, and the retrieved printing job. Here, the recreated printing job information (DB) 904 is registered. In S1910, the job management server 105 returns the recreated print code to the metaverse server 106.

In S1911, the VR terminal 101 receives the returned print code. In S1912, the VR terminal 101 transmits the print code and the metaverse user ID to the printing device 102 selected at a point in time of S1904. When the printing device 102 receives the print code and the metaverse user ID, the printing device 102 transmits a printing request to the job management server 105 together with the ID of the printing device 102 in S1913.

In S1914, the job management server 105 retrieves a file related to a print code from the print code described above. In 51915, a printing job is generated based on the retrieved file. In S1916, the job management server 105 transmits the generated printing job, the ID of the printing device 102, and the printing request to the printing device management server 104. In S1917, the printing device management server 104 issues a printing command to the printing device 102 corresponding to the ID based on the printing job. In 51918, the printing device 102 performs printing.

Figure 20A:
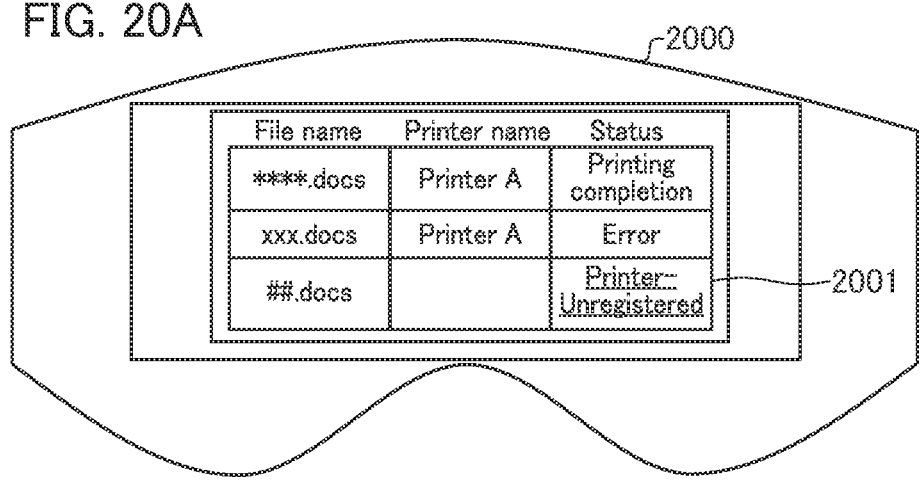
FIGS. 20A to 20C are diagrams illustrating an example of a screen for performing a printing operation in the VR terminal according to the second embodiment.
Figure 20B:
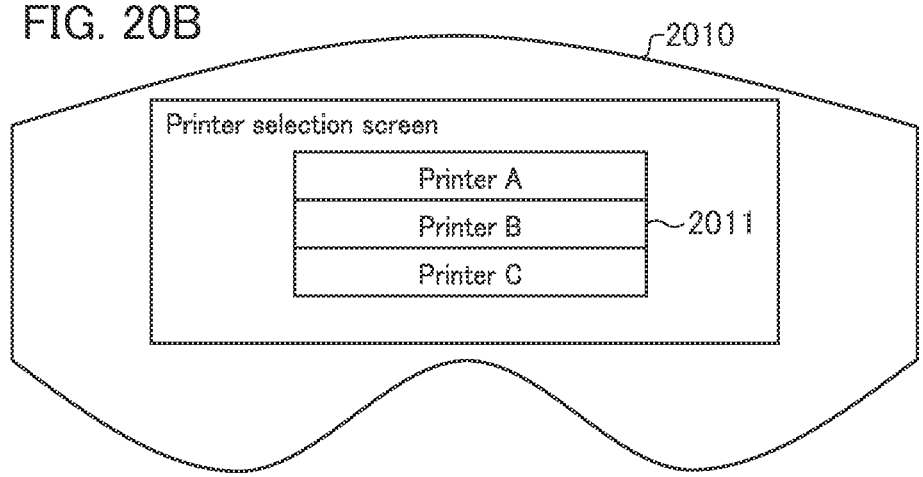
Figure 20C:
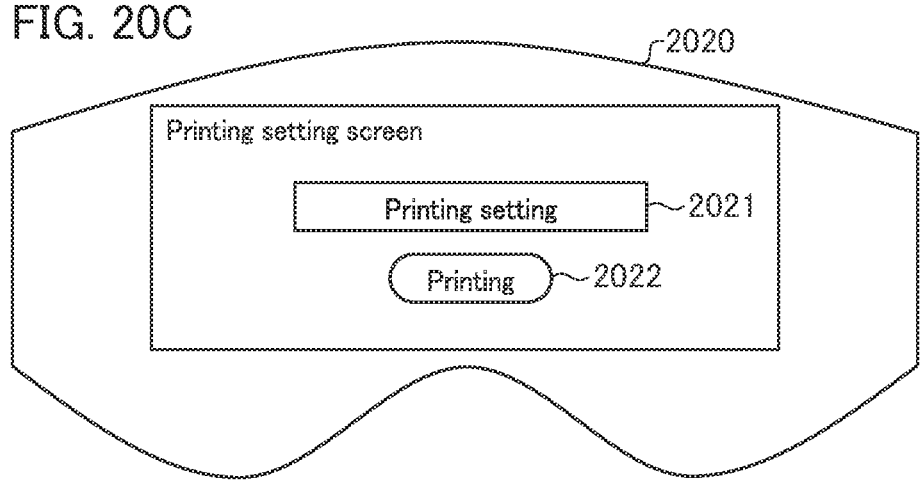

FIGS. 20A to 20C are diagrams illustrating an example of a screen for performing a printing operation in the VR terminal 101 according to the second embodiment. FIG. 20A is an example of a screen for selecting a list of printing jobs. FIG. 20B is an example of a screen for selecting a printing device. FIG. 20C is an example of a screen for selecting printing settings.

The screen in FIG. 20A is displayed on the display of the VR terminal 101 by the user in S1903 of FIG. 19. A job selection screen 2000 shows a GUI framework in the VR terminal 101, and a list of jobs is displayed in an area 2001. When the user selects a file displayed in area 2001, the screen moves to a printing device selection screen.

The screen in FIG. 20B is displayed when the user selects a printing device at a point in time of S1904 of FIG. 19. A printing device selection screen 2010 shows a GUI framework in the VR terminal 101. A job creation button is pressed without selecting a printing device in the area 2011 to move to create a printing job.

The screen in FIG. 20C is displayed at a point in time when a printing setting to be used is selected in S1905 of FIG. 19. A printing setting 2021 includes the number of print copies, a paper size, a layout, a double-sided printing setting, a printing color setting, a printing range, and the like. Information displayed in the printing setting 2021 is not limited to the number of copies, the paper size, the layout, the double-sided printing setting, the printing color setting, and the printing range. The printing setting may be equipped with a function of receiving an input in an input box or a selection box. Thus, the user uploads the file and edits the printing setting 2021. When the user presses a printing button 2022, the job management server 105 can issue a print code, register print code information, and execute a printing request from the VR terminal 101.

Other Embodiments

Embodiments of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments, and by a method performed by the computer of the system or apparatus by, for example, reading out and executing the computer-executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-176788, which was filed on Nov. 2, 2022 and which is hereby incorporated by reference wherein in its entirety.

What is claimed is:

1. A system comprising:
a content management system; and
a printing system,
wherein the printing system comprises:
a memory storing instructions, and
a processor configured to execute the instructions to cause the printing system to:
provide a print code issued by the printing system to a terminal based on a user's content printing operation in a virtual space projected and provided using the terminal; and
transmit printing data for printing content data corresponding to the user's content printing operation to a printing device in response to reception of a printing request including the print code from the printing device that has received the print code from the terminal.

2. The system according to claim 1,
wherein the processor further causes the printing system to provide the print code to the terminal in response to the user's content printing operation being performed and to user identification information and printing device identification information being provided.

3. The system according to claim 2,
wherein the processor further causes the printing system to register the print code, the user identification information, and the printing device identification information in association with each other.

4. The system according to claim 3,
wherein the printing request is information in which the print code, the user identification information, and the printing device identification information are associated with each other, and
the processor further causes the printing system to transmit the printing data to the printing device if the print code, the user identification information, and the printing device identification information in the printing request all match registered information.

5. The system according to claim 3,
wherein, in a case where the printing operation is performed, the user identification information is provided, and the user gives an instruction not to select a printing device, the processor causes the printing system to register the print code and the user identification information in association with each other.

6. The system according to claim 5,
wherein, in a case where the user gives an instruction to select a printing device, the processor causes the printing system to register the print code, the user identification information, and the printing device identification information in association with each other,
the printing request is information in which the print code, the user identification information, and the printing device identification information are associated with each other, and
the processor causes the printing system to transmit the printing data to the printing device, if the print code, the user identification information, and the printing device identification information in the printing request all match information registered by the processor.

7. The system according to claim 1,
wherein the printing operation is an operation in which the content is uploaded.

8. The system according to claim 3,
wherein the processor causes the printing system to register the content data in association with the print code.

9. A control method for a system including a content management system and a printing system, the control method comprising:
providing a print code issued by the printing system to a terminal based on a user's content printing operation in a virtual space projected and provided using the terminal; and
transmitting printing data for printing content data corresponding to the user's content printing operation to a printing device in response to reception of a printing request including the print code from the printing device that has received the print code from the terminal.

* * * * *